May 29, 1928.  
J. CROMIE  
1,671,409  
ELECTRIC VALVE CONTROL  
Filed Nov. 5, 1925
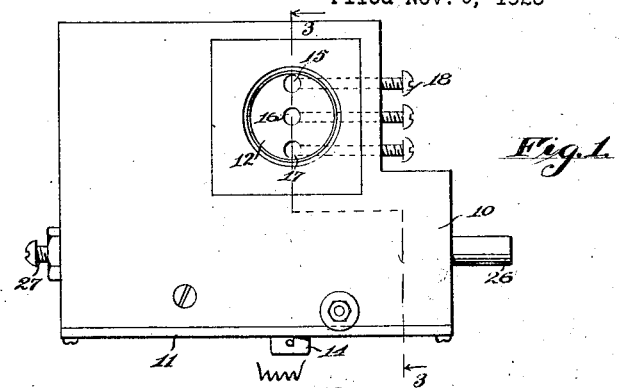
Fig. 1
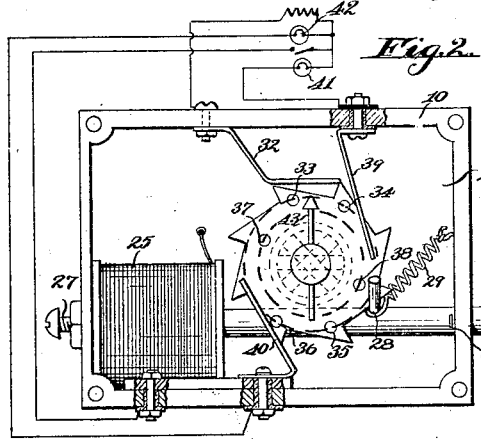
Fig. 2
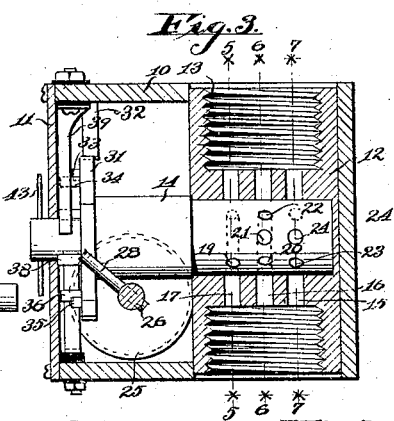
Fig. 3
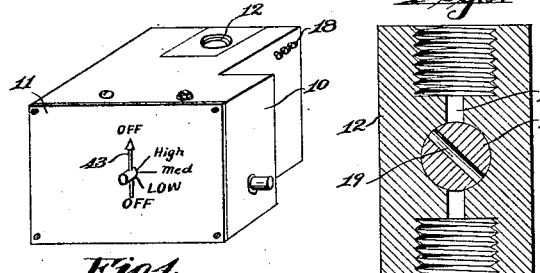
Fig. 4  Fig. 5  Fig. 6  Fig. 7
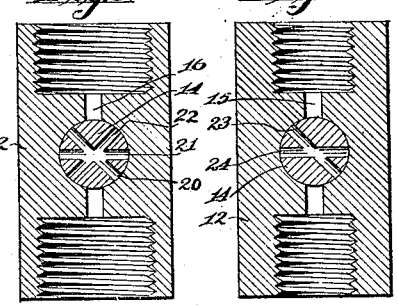
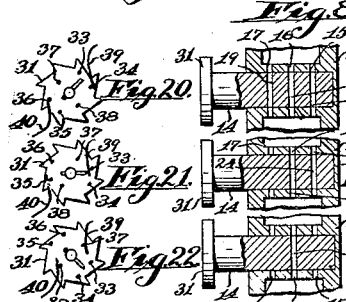
Fig. 8
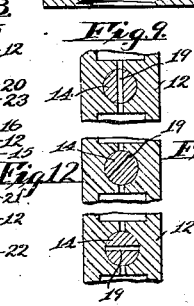
Fig. 9  Fig. 12  Fig. 16
Fig. 10  Fig. 13  Fig. 17
Fig. 11  Fig. 14  Fig. 15  Fig. 18  Fig. 19
Inventor  
James Cromie.  
By Hazard and Miller  
Attorneys Patented May 29, 1928.

1,671,409

UNITED STATES PATENT OFFICE.

JAMES CROMIE, OF PASADENA, CALIFORNIA.

ELECTRIC VALVE CONTROL.

Application filed November 5, 1925. Serial No. 67,189.

This invention relates to improvements in electric valve controls.

An object of the invention is to provide an improved valve adapted to control the flow of fuel to a suitable burner and which is operable by opening and closing a remotely located switch.

Another object of the invention is to provide an electrically operated valve of improved construction.

A further object of the invention is to provide a valve having a body in which a stem is rotatably mounted, which stem is so constructed that upon rotation various quantities of fuel can be supplied to the burner, thus permitting a low, medium or high fire to be controlled by the valve.

A still further object of the invention is to provide an indicating mechanism for indicating which kind of fire is burning at the remotely located switch.

With the foregoing and other objects in view which will be made manifest in the following detailed description and specifically pointed out in the appended claims, reference is had to the accompanying drawings for an illustrative embodiment of the invention, wherein:

Figure 1 may be considered as a top plan view of the improved electric valve control, Fig. 2 is a front elevation of the valve control, the cover of the casing being removed so as to illustrate its interior, Fig. 3 may be considered as a sectional view taken substantially on the line 3—3 of Fig. 1, Fig. 4 is a perspective view of the improved valve control, Fig. 5 is a sectional view taken substantially on the line 5—5 of Fig. 3, Fig. 6 is a sectional view taken on the line 6—6 of Fig. 3, Fig. 7 is a sectional view taken on the line 7—7 of Fig. 3, Fig. 8 is a diametrical section through the stem when in the position for burning a high fire, Fig. 9 is a section taken on the line 5—5 of Fig. 3 when the stem is in the position as shown in Fig. 8, Fig. 10 is a view taken on the line 6—6 of Fig. 3 when the stem is in the position shown in Fig. 8, Fig. 11 is a view taken on the line 7—7 of Fig. 3 when the stem is in the position shown in Fig. 8, Fig. 12 is a diametrical section through the stem when in the position to cause a medium fire to burn, Figs. 13, 14 and 15 are sectional views taken upon the lines 5—5, 6—6 and 7—7 respectively upon Fig. 3 when the stem is in the position shown in Fig. 12, Fig. 16 is a diametrical section through the stem when in the position causing a low fire to burn, Figs. 17, 18 and 19 are sectional views taken upon the line 5—5, 6—6 and 7—7 respectively upon Fig. 3 when the stem is in the position shown in Fig. 16, Fig. 20 is a diagrammatical view illustrating the position of the contacts constituting a part of the indicating system when the stem is in the position shown in Fig. 8 causing a high fire to burn, Fig. 21 is a similar view to Fig. 20 illustrating the position of the contacts when a medium fire is caused to burn, and Fig. 22 is a view similar to Fig. 20 illustrating the positions taken when a low fire is caused to burn.

Referring to the accompanying drawings wherein similar reference characters designate similar parts throughout, the improved electric valve control consists of a casing 10 having a removable cover or front wall 11. In this casing there is mounted a valve body 12 which has its ends internally threaded, as indicated at 13, for attaching to a fuel supply pipe. In the body there is rotatable a stem 14, and three parallel bores 15, 16 and 17 are formed in the body 12 in a plane passing through the axis of the stem 14. The fuel passing through the fuel line is caused to pass through one or more of these bores when the valve is open, and the flow through the various bores is adjusted by means of set screws 18. In the stem 14 there are a plurality of diametrical passages, which passages are capable of being brought into register with the various bores 15, 16 and 17, permitting fuel to flow through the bores.

The passages through the stem are arranged as follows: In the plane represented by the line 5—5 upon Fig. 3 there is merely a single diametrical passage indicated at 19. In the plane represented by the line 6—6 upon Fig. 3 there are formed three diametrical passages 20, 21 and 22. The passage 20 is arranged parallel to the passage 19, and the passages 21 and 22 intersect with each other and with the passage 20. The three diametrical passages 20, 21 and 22 are angularly spaced from each other, preferably at about 45 deg. In the plane represented by the line 7—7 upon Fig. 3 there are formed two intersecting diametrical passages indicated at 23 and 24. The passage 23 is parallel to the passages 19 and 20, and the passage 24 is parallel to the passage 21. In view of the fact that the three bores 15, 16 and 17 are parallel and the passages 19, 20 and 23 are also parallel, it will be readily appreciated that upon rotation of the stem 14, all of the bores can be simultaneously opened. Because of the fact that the passages 24 and 21 are parallel, it is possible to rotate the stem into such a position that only the bores 15 and 16 are open. As there is no passage parallel to the passage 22, when this passage is brought into registration, only the bore 16 will be open, the other two bores being closed. As the various passages through the stem are arranged at 45 deg. from each other, there is left on the peripheral surface of the stem sufficient surface to close all of the bores 15, 16 and 17, this being shown in Figs. 5, 6 and 7. From the above described construction it will be understood that upon rotation of the stem 14 a high fire, a medium fire or a low fire can be caused to burn or the fire can be completely turned out.

As a means for rotating the stem 14 there is mounted within the casing 10 a solenoid 25. A core 26 has one end slidable into the solenoid 25 and has the other end slidable in an aperture formed in the casing 10. The solenoid 25 is adapted to be energized by a remotely located switch indicated in the wiring diagram upon Fig. 2. When it is energized it causes the core 26 to be drawn into it, and such movement of the core 26 is adjustable by means of a screw 27 held in place by means of a jam nut as clearly shown on Fig. 2. The core 26 carries a pin 28 which is rigidly mounted upon it, and which normally assumes an inclined position with respect to the axis of the stem 14. Fastened to this pin is a coil spring 29 which is fastened to the interior of the casing 10. The coil spring 29 serves to return the core 26 to its normal position, and the returning movement is limited by a stop 30. On the forward end of the stem 14 there is mounted a ratchet wheel 31 shown as being provided with eight teeth because of the fact that there are four possible positions in half a revolution which the stem 14 can assume, namely, high fire, medium fire, low fire and completely turned off. The pin 28 serves as a pawl engageable upon the teeth of the ratchet wheel 31. A back-up pawl 32 preferably formed of resilient metal also engages upon the teeth of the ratchet wheel 31.

The operation of the solenoid and core to rotate the stem 14 is as follows: When the solenoid 25 is energized the core 26 slides into it, stretching the coil spring 29. The pin 28 engages one of the ratchet teeth and causes the ratchet wheel to rotate one-eighth of a revolution. By the arrangement of parts the pin 28 in swinging the ratchet wheel is caused to swing from its inclined position to a position which is horizontal or parallel to the axis of the stem 14. When the ratchet wheel has been so swung, the back-up pawl 32 engages the next successive tooth and prevents reverse rotation of the ratchet wheel. Upon de-energizing the solenoid 25 or breaking the electric circuit through it by opening the remotely located switch, the spring 29 retracts or withdraws the core 26 from within the solenoid. At the same time it produces rotation of the core 26, swinging the pin into its initial inclined position. Obviously upon each successive closing of the remotely located switch, the stem 14 will be rotated one-eighth of a revolution.

The indicating mechanism for indicating at the remotely located switch the position of the stem 14 and consequently what fire is burning consists of the following structure. On the forward face of the ratchet wheel 31 there are arranged four projecting pins 33, 34, 35 and 36. These projecting pins are arranged upon the same circumference as indicated by the dash line upon Fig. 2 about the center of the stem 14. Two other projecting pins 37 and 38 are also provided upon the ratchet wheel 31, but these projecting pins are arranged upon a circumference disposed within the circumference on which the pins 33, 34, 35 and 36 are arranged. The pins 34, 37, 36 and 38 are all of the same length and are longer or project farther than the pins 33 and 35. A resilient stationary contact 39 is arranged so that because of its natural resiliency, it is approximately tangent to the inner circumference on which the pins 37 and 38 are arranged. A stationary contact 40 is also mounted within the casing 10 and is so arranged that because of its natural resiliency, it will normally assume a position approximately tangent to the outer circumference on which the pins 33, 34, 35 and 36 are arranged, so that it will engage the pins 33, 34, 35 and 36, but will not engage the pins 37 and 38. As indicated in Fig. 3, the stationary contact 39 is so arranged that the short pins 33 and 35 can pass beneath it without engaging it, while the contact 40 is arranged closer to the face of the ratchet wheel so that it can engage certain of the long as well as the short pins. It will be kept in mind, however, that even though the pins 37 and 38 are long pins, they are arranged upon the inside circumference so that they will not engage the contact 40 regardless of their length. The stationary contact 39 is connected through a red lamp indicated at 41, which is located adjacent the remotely located switch. The red lamp is in circuit with a suitable source of electric current indicated, for example, by the secondary coil of a transformer one end of which is grounded with respect to the casing 10. In a similar manner the contact 40 is connected in circuit with a white lamp 42 located adjacent the remotely located switch. In the position shown in Fig. 2, wherein the bores 15, 16 and 17 are all closed, the contacts 39 and 40 are not engaging any of the pins on the ratchet wheel. On closing the remotely located switch, the core 26 will cause the stem 14 and the ratchet wheel 31 to rotate one-eighth of a revolution, and because of the arrangement of the passages in the stem the first eighth of a revolution will cause all of the bores 15, 16 and 17 to be simultaneously opened. The pins 34 and 36 will be so formed that they will be brought opposite the contacts 39 and 40, and because of the fact that both of the pins are long pins, both contacts will be engaged, thus closing the circuit through both of the lamps 41 and 42, indicating that a high fire is burning. This is indicated in Fig. 20.

When the remotely located switch is again closed, the stem 14 and the ratchet wheel will be caused to rotate a second eighth of a revolution, bringing the passages 21 and 24 into register with the bores 16 and 15, causing a medium fire to burn. In such a position the ratchet wheel will have moved into the position shown in Fig. 21. As the pin 33 is a short pin it will not engage the contact 39, but will be positioned beneath it, so that the circuit through the red lamp 41 will not be closed. The pin 35, however, even though it is a short pin, will engage the contact 40 causing the circuit through the white lamp 42 to close and thus indicate that a medium fire is burning.

During the next eighth of a revolution of the stem 14 only the passage 22 will be brought into register with a bore, namely, the bore 16, causing a low fire to burn. In such a position the pins assume the position shown in Fig. 22. In this position the pin 37 is opposite the contact 39 and the pin 38 is opposite the contact 40. The pin 38, however, being on an inside circumference will not engage the contact 40 even though it is a long pin. The pin 37 being a long pin but also being located on the inside circumference engages the contact 39, so that the circuit through the red lamp 41 is the only one which is closed, indicating a low fire.

During the next eighth of a revolution, which brings the stem and ratchet wheel into a position 180 deg. from the position shown in Fig. 2, both of the contacts 39 and 40 will be disengaged, so that the circuits through the lamps 41 and 42 will both be open, so that neither lamp will burn and thus indicate that there is no fire burning.

It will be noted that the various pins are arranged diametrically opposite, or are in symmetrical relation with respect to the center of the ratchet wheel, so that during the last half of a complete revolution, the same cycle of events occurs. The end of the stem 14 preferably projects through the cover 11 upon the casing and is provided with a pointer 43. On the cover there may be suitable indicia, such as are shown upon Fig. 4. The end of the core 26 preferably extends through the side wall of the casing 10 a considerable distance so that it is possible to manually operate the valve if found desirable. This can be done by merely pushing the core 26 into the solenoid by applying pressure to the projecting end. This causes the coil spring 29 to be stretched and causes the pin 28 to engage a tooth and rotate the ratchet wheel and stem. When the valve is manually operated, the pointer 43 permits the position of the stem 14 to be determined.

From the above described construction it will be appreciated that an improved valve control is provided consisting of a rotatable stem having an improved electro-magnetic means for rotating it. Furthermore, the single stem upon rotation is capable of producing various flames, and lastly that the indicating mechanism will indicate the position of the stem in the valve body 12.

It will be understood that various changes may be made in the detail of construction without departing from the spirit or scope of the invention as defined in the appended claims.

I claim:

1. A valve control comprising a body having a bore therethrough, a stem rotatable in said body having means for passing various quantities of liquid adapted to be brought into register with said bore, a ratchet wheel mounted upon said stem, a solenoid adapted to be energized to actuate the stem, a core slidable into said solenoid upon its energization, and a projection rigid with said core engageable upon the teeth of the ratchet wheel, whereby it is necessary for the core to partially rotate in causing rotation of the ratchet wheel.

2. A valve control comprising a body having a bore therethrough, a stem rotatable in said body having means for passing various quantities of liquid adapted to be brought into register with said bore, a ratchet wheel mounted upon said stem, a solenoid adapted to be energized to actuate the stem, a core slidable into said solenoid upon its energization, a projection rigid with said core engageable upon the teeth of the ratchet wheel, whereby it is necessary for the core to partially rotate in causing rotation of the ratchet wheel, and a spring for withdrawing the core and reversely rotating it into its initial position when the circuit through the solenoid is broken.

3. A valve control comprising a body having a bore therethrough, a stem rotatable in said body having means for passing various quantities of liquid adapted to be brought into register with said bore, a ratchet wheel mounted upon said stem, a solenoid adapted to be energized to actuate the stem, a core slidable into said solenoid upon its energization, a projection rigid with said core engageable upon the teeth of the ratchet wheel, whereby it is necessary for the core to partially rotate in causing rotation of the ratchet wheel, a spring for withdrawing the core and reversely rotating it into its initial position when the circuit through the solenoid is broken, and a back-up pawl engageable upon the ratchet wheel for preventing reverse rotation of the ratchet wheel and stem during the return of the core to its initial position.

4. A valve comprising a body having three parallel bores therethrough, a stem rotatable in said body having three parallel diametrical passages therethrough and a pair of diametrical passages therethrough which are in the same planes as, but not parallel to two of the mentioned three passages, whereby the pair of passages may be caused to simultaneously register with two of said bores or the three passages may be caused to simultaneously register with said bores upon rotation of said stem.

5. A valve comprising a body having three parallel bores therethrough, a stem rotatable in said body having three parallel diametrical passages therethrough and a pair of diametrical passages therethrough which are in the same planes as, but not parallel to two of the mentioned three passages, whereby the pair of passages may be caused to simultaneously register with two of said bores or the three passages may be caused to simultaneously register with said bores upon rotation of said stem, and electro-magnetic means for rotating said stem from one position to another.

6. A valve comprising a body having three parallel bores therethrough, a stem rotatable in said body having three parallel diametrical passages therethrough and a pair of diametrical passages therethrough which are in the same planes as, but not parallel to two of the mentioned three passages, there being another diametrical passage formed in said stem in the same plane with two of the mentioned passages which are in the same plane but which are not parallel, said passages being so arranged that upon rotation of the stem the last mentioned passage may be caused to register alone with one of said bores or the pair of passages may be caused to simultaneously register with two of the bores or the three parallel passages may be caused to register with the three bores.

7. A valve comprising a body having three parallel bores therethrough, a stem rotatable in said body having three parallel diametrical passages therethrough and a pair of parallel diametrical passages therethrough which are in the same planes as, but not parallel to two of the mentioned three passages, there being another diametrical passage formed in said stem in the same plane with two of the mentioned passages which are in the same plane but which are not parallel, said passages being so arranged that upon rotation of the stem the last mentioned passage may be caused to register alone with one of said bores or the pair of passages may be caused to simultaneously register with two of the bores or the three parallel passages may be caused to register with the three bores, said passages being so arranged that the stem is capable of assuming a position in which all of the bores are closed thereby.

8. A valve comprising a body having three parallel bores therethrough, a stem rotatable in said body having three parallel diametrical passages therethrough and a pair of diametrical passages therethrough which are in the same planes as, but not parallel to two of the mentioned three passages, there being another diametrical passage formed in said stem in the same plane with two of the mentioned passages which are in the same plane but which are not parallel, said passages being so arranged that upon rotation of the stem the last mentioned passage may be caused to register alone with one of said bores or the pair of passages may be caused to simultaneously register with two of the bores or the three parallel passages may be caused to register with the three bores, and electro-magnetic means for rotating said stem from one position to another.

9. A valve comprising a body having a plurality of bores therethrough, a stem rotatable in said body, said stem having a plurality of passages therethrough, said passages being so arranged that upon rotation of the stem all of the bores will first be opened and upon further rotation the bores will be consecutively closed, means providing a flange upon said stem, pins providing contacts projecting from a side face of said flange, some of said pins being shorter than others, a stationary contact engageable only upon certain of said long pins, a second stationary contact engageable upon the short and certain of the long pins, said stationary contacts being adapted to be connected to an indicating device so that the number of bores which are open may be remotely determined and electro-magnetic means for rotating said stem.

10. An electric valve control comprising a body having a bore therethrough, a stem rotatable in said body having a passage therethrough adapted to be brought into register with said bore, means providing projections upon said stem, a solenoid, and a core slidable into said solenoid, said core having a projection rigid therewith engageable upon the projections on said stem so as to produce rotation of the stem when the core is attracted by said solenoid.

11. An electric valve control comprising a body having a bore therethrough, a stem rotatable in said body having a passage therethrough adapted to be brought into register with said bore, means providing projections upon said stem, a solenoid, a core slidable into said solenoid, said core having a projection rigid therewith engageable upon the projections on said stem so as to produce rotation of the stem when the core is attracted by said solenoid, and a back-up pawl engageable upon the projections on said stem for preventing reverse rotation of the stem.

In testimony whereof I have signed my name to this specification.

JAMES CROMIE.